Jan. 20, 1970     H. L. WHISENHUNT     3,490,166
BAIT FISHING RIG
Filed Dec. 8, 1967     2 Sheets-Sheet 1
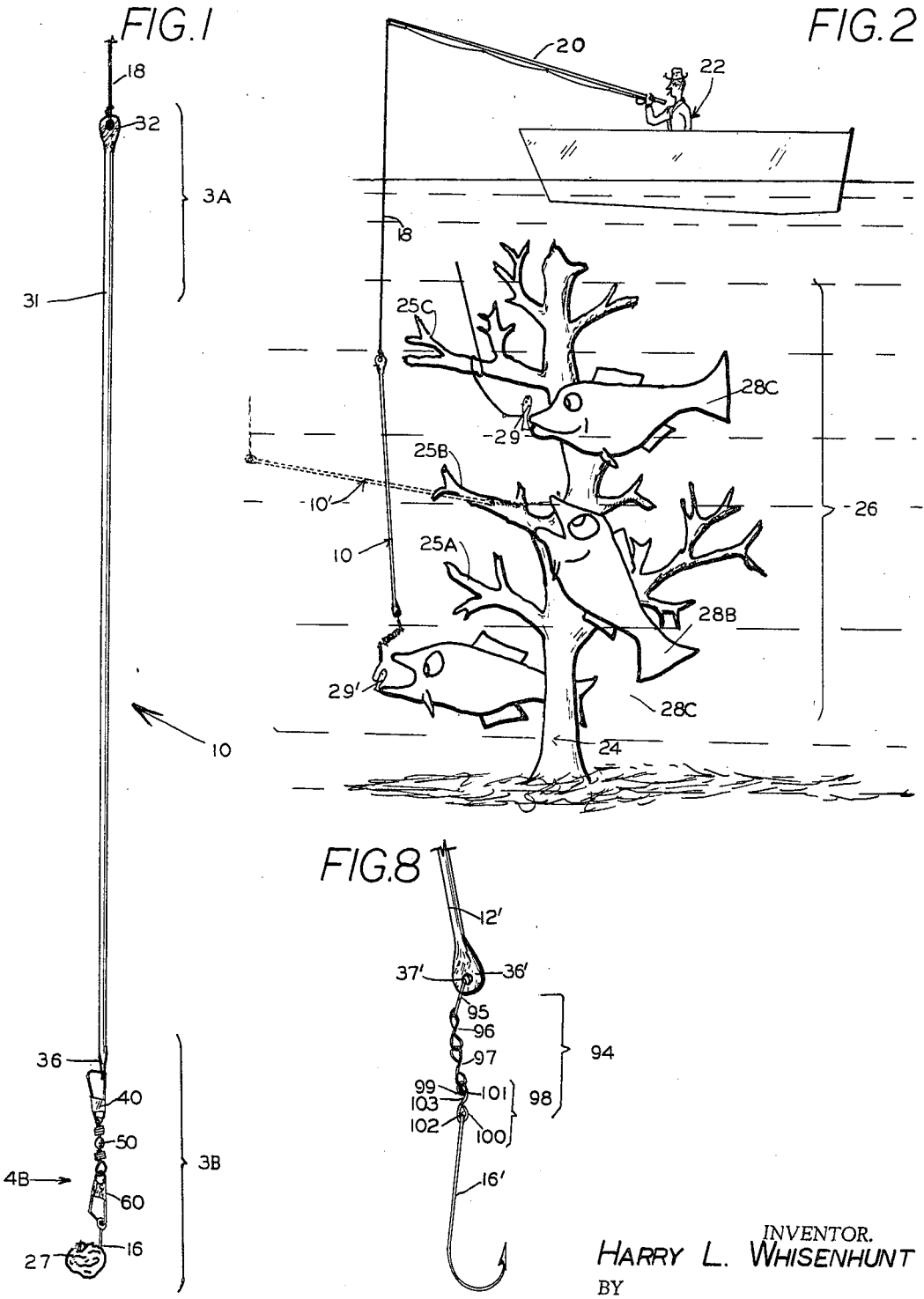
INVENTOR.
HARRY L. WHISENHUNT
BY
Ely Silverman
ATTORNEY Jan. 20, 1970   H. L. WHISENHUNT   3,490,166
BAIT FISHING RIG
Filed Dec. 8, 1967   2 Sheets-Sheet 2
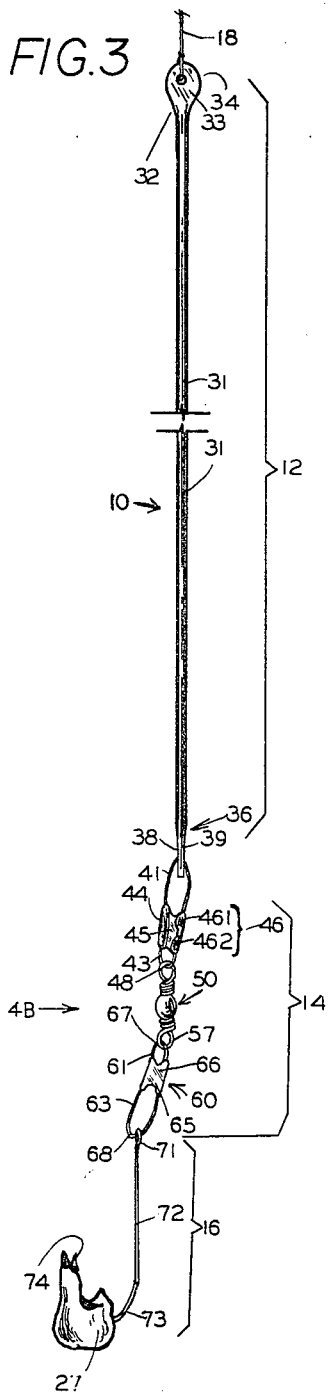
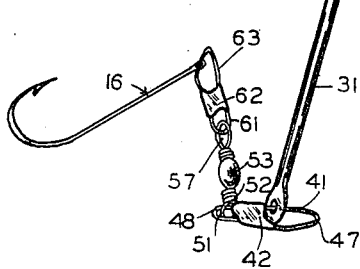
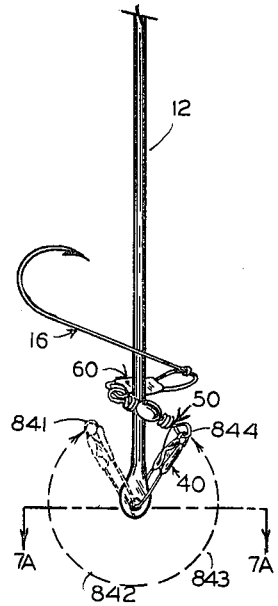
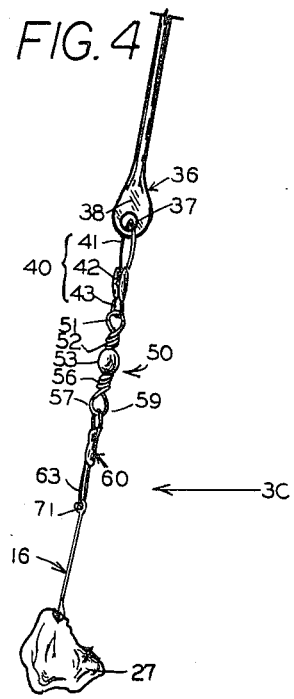
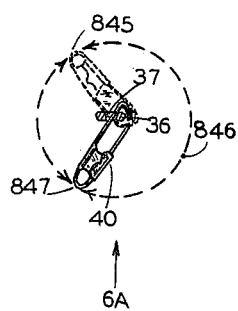
INVENTOR.
HARRY L. WHISENHUNT
BY
*Ely Silverman*
ATTORNEY

United States Patent Office 3,490,166
Patented Jan. 20, 1970

3,490,166
BAIT FISHING RIG
Harry L. Whisenhunt, 903 Beverley Drive,
Borger, Tex. 79007
Filed Dec. 8, 1967, Ser. No. 689,103
Int. Cl. A01k 95/00
U.S. Cl. 43—43.15                             4 Claims

ABSTRACT OF THE DISCLOSURE

A fishing rig consisting essentially of a long, thin, dense, stiff, yet resilient rod, a few short serially connected rigid link elements, and a hook, with relative and absolute size relations in a particular range. The maximum length of the linked series of links and hook is less than one quarter the length of the rod, and the weight of the series of links and hook is less than 20 percent of the weight of said rod.

BACKGROUND OF THE INVENTION

The field of this invention

A fishing apparatus providing a novel plug and leader and line combination.

Description of the prior art

Weights are usually required to be attached to a fishing line to bring a baited hook to a depth whereat fish may be attracted to the bait. The usual flexible line spacing such hook and bait usually tangles in underwater brush when live bait is used and a hooked fish can also tangle such apparatus in underwater brush and then escape from the hook, whether live or dead bait is used. Additionally, dead bait is not as effective as bait moving in a live manner.

While devices attempting to simulate motion of live bait are available, such apparatuses are complex and expensive. The apparatus of this invention is inexpensive, sturdy and simulates motion of live bait.

SUMMARY OF THE INVENTION

A long resilient yet stiff light-weight yet dense metal rod provides for carrying a baited hook to depths in fishing waters yet has sufficiently low inertia to avoid loss of a striking fish. Relatively short lengths of a short series of small rigid links (short relative to the longer rod length) and the particular connection of those members of such series provide for preventing tangling of the apparatus in underwater brush, simulate the motion of live bait and permit live bait to be seen in its usual behaviour pattern.

DESCRIPTION OF THE DRAWINGS

FIGURE 1 is an overall view, to scale, of the apparatus 10 of this invention.

FIGURE 2 shows, in a composite view, the apparatus 10 of this invention in two different positions during its operational use, and a standard rig.

FIGURE 3 is a composite enlarged view of zones 3A and 3B of FIGURE 1 as seen in direction of arrow 3C of FIGURE 4.

FIGURE 4 is a view of the elements shown in zone 3B of FIGURE 1 as seen along direction of arrow 4B of FIGURE 1, i.e. in a view at 90° to the direction of view illustrated in FIGURE 3.

FIGURE 5 illustrates a modified spatial arrangement of the parts shown in FIGURES 3 and 4.

FIGURE 6 illustrates another spatial arrangement of parts shown in FIGURES 3–5 and an alternate position of element 40.

FIGURE 7 is a sectional view along plane 7A of FIGURE 6, showing two extreme positions of element 40 relative to element 31 (one in broken lines, the other in full lines).

FIGURES 3 through 7 are all drawn to the same scale.

FIGURE 8 is another embodiment of apparatus shown as viewed in FIGURE 3.

FIGURES 6 and 7 also show diagrammatically the zone of travel of the end of element 40 relative to element 31.

DESCRIPTION OF THE PREFERRED EMBODIMENTS

The apparatus 10 of this invention comprises a stiff rod unit 12, a non-tangling link assembly 14, and a hook 16, operatively connected, In usual operation thereof apparatus 10 is connected in conventional manner to a flexible line 18 and, therefrom, to a pole 20 which is held by operator 22. In operative position of apparatus 10 a portion of line 18 and the entire apparatus 10 are submerged in a watery zone 26 wherein there are, for purpose of illustration, brush as 24, having branches as 25A, 25B and 25C, and fish as 28B and 28C. 10' shows a modified position of 10 in FIGURE 2.

The unit 12 comprises a rod 31, an upper flat end plate 32, with an upper hole 33 passing transversely therethrough, and a lower or bottom plate 36 with a lower hole 37 passing transversely therethrough. In a preferred embodiment the staff 31 is a straight cylindrical semi-hard tempered wire 16 inches long from one end to the other, made of steel and rust-colored.

The rod 31 is flattened on its lower end and formed into lower plate 36. The plate 36 and the plate 32 are of the same size and shape. The flat surfaces of each side 38 and 39 of the plate 36 are parallel to each other, as is generally shown in FIGURE 3; similarly, the faces (as 34) of each side of plate 32 are parallel to each other. The faces of plate 36 are at 90° angle to the corresponding faces of plate 32, as shown in FIGURES 1 and 3.

The link assembly 14 comprises an inner snap link 40, an intermediate swivel 50 and an outer snap link 60. The elements 40, 50 and 60 are joined to each other in linked series as shown in FIGURES 3–6.

The snap link 40, is formed by a stiff inner loop 41, a rigid body 42, and a stiff outer loop 43. Loops 41 and 43 are formed of a single piece of strong resilient metal wire 49.

The body 42 is formed of a flat metal base plate 45, one side of which is continuous and integral with a curved spined plate 44. The other side of the plate 42 is formed into a longitudinally extending C-shaped guard plate 46; guard plate 46 has an open portion 461 and a shut portion 462; both are continuous and integral with base plate 45. The spine plate 44 firmly wraps around and holds a central portion of the wire at 41. One, outer or distant, end of the wire forming the loop 41 is firmly yet releasably held by open portion, 461, of plate 46 in the general manner of a safety pin. The other end 462 of plate 46 firmly wraps around and holds one end of loop 43. Plate 45 is a rigid thin metallic plate.

The swivel element of 50 comprises a rigid inner circular wire loop 51, a rigid cylindrical neck wire 52 attached thereto, a hollow rigid shell 53, and balls (not shown) within the shell, an outer rigid cylindrical wire neck 56 and an outer circular loop 57.

Shell 53 has the general shape of an egg, i.e. rounded and larger at its center than at its ends. It has one circular hole at its top and another at its bottom, each hole is the same size. A solid ball of larger diameter than the diameter of such holes is located in the shell and is firmly and rigidly connected to the stiff wire 59 of which 51 and 52 are formed. A ball of the same size as the solid ball is also located in shell 53 and is firmly and rigidly connected to the wire 59 of which neck 56 and loop 57 are formed. The loops 51 and 57 may thus rotate respectively to each other about an axis passing through these loops and the center of the shell 53. Otherwise loops 51 and 53 have substantially no movement with respect to each other, i.e. the maximum displacement of the central longitudinal axis of neck 52 to the corresponding axis of the neck 56 is about 10 degrees.

The outer snap link 60 comprises an inner stiff loop 61, a rigid body 62, a stiff outer loop 63.

The body 62 is a plate provided with a spine that firmly grasps the wire of which the rings 61 and 63 are formed. A latch thereon has two portions, one of which firmly grasps the end of the loop 61 and the other which may be opened to provide for release of the free end of the loop 63; generally speaking, the structure and connections of the components of link 60 are identical to those of inner link 40 and link 60 is formed of elements as 61 through 68 corresponding, respectively, to the elements 41 through 48 and 461 and 462 respectively of link 40, above described and identical therewith.

The hook 16 is provided with an eye 71, a resilient yet stiff body 72, a rounded portion 73 and a point 74. In its particularly preferred embodiment of this apparatus the dimensions of the elements above described are recited in Table I.

FIGURES 3 through 7 are drawn to scale to illustrate dimensions and relations between dimensions not expressed in Table I or otherwise in this text.

Loop 41 engages hole 37 of plate 36; loop 43 engages with loop 51; loop 57 engages with loop 61, loop 63 engages eye 71, as shown in FIGURES 3–6, to form a linked series.

The shaft 31 is accordingly pivotally connected to the element 40 for extensive but limited relative motion therebetween. The element 40 may rotate in the generally spherical zone whose outline is shown in broken lines as 841, 842, 843 and 844 and 37 in FIGURE 6 and 845, 846 and 847 in FIGURE 7, but this movement is proscribed between points as 845 and 847 of FIGURE 7 and between 844 and 843 of FIGURE 6.

The longitudinally stiff swivel element 50 is linked to and rotatable relative to the element 40 by the pivotal link engagements of the loop 51 with the shell 53 and the pivotal engagement of shell 53 with loop 57; this provides a range of movement of the element 50 relative to the element 40 from that shown in FIGURES 3 and 4 to that of FIGURE 5 as well as that shown in FIGURE 6. The element 40 does not, in combination with element 60, provide for any tangling thereof about the shaft 31. The element 60 is connected by its loop 61 to the ring 57 of the swivel 50, and, even as shown in FIGURE 6, also does not provide for any tangling of the link assembly 14 on the rod 12.

As shown in FIGURE 5 the loop 41 may engage hole 37 at the portion of the loop 41 adjacent to the body plate 45 of body 42 rather than that terminal portion 47 of the loop 41 which makes contact with the edges of that hole. Also, loop 51 may contact loop 43 near base plate 45 rather than at the most distant point, along loop 43 from base 42. Thus, not only does apparatus 10 provide for limited rotary motion of the link 40 relative to the staff 31 and limited rotary motion of the swivel 50 relative to the link 40 and limited rotary motion of the link 60 relative to the swivel 50 as above described, but also there may be, as shown in FIGURE 5, longitudinal motion of these elements relative to each other. Accordingly, on attachment of dead bait, as 27, on to the hook 16, the motion of the water currents against the plates 32 and 36 provides a rotation of the vertically oriented shaft 31 about its vertical longitudinal axis; this rotation of the rod 31 permits any one or all the elements of assembly 14 as 40 to rotate and travel about hole 37 smoothly within a limited space; at the limit or end of such limited travel of the rod relative to the link assembly 14 combination of elements there is a "snap" action or a "twitch" of the hook 16 and the bait thereon relative to the shaft 31: this is due to the rapid acceleration then applied to the link assembly 14 and, thereby, on the hook 16 and the material thereon by the rod 31, which weighs at least 12 times as much as does assembly 14: this motion does give a similitude of life to non-live bait, worms or cut bait or any other kind of bait as 27 that has no life and cannot move under its own power which may be attached to hook 16 and caused so to move by water currents as above described.

Also, up and down motion of the pole 20, which motion is such that the end of line 18 attached to pole 20 moves up or down by a distance (of about 2 inches) which is the length of link assembly 14 from the point of attachment thereof to the hole 37 to the eye 71 results in an irregular or "twitchy" motion of the hook 16 and thus will also cause the bait to simulate the motion of live bait; this is because on such vertical motion of the line 18, because line 18 is attached to the top of and supports rod 31 in the zone 26, and because of the looseness of the connections between the rigid link elements 40, 50 and 60 and the almost negligible weight of assembly 14 relative to rod 31, sideways motions also are produced in the material carried on hook 16. This irregular motion is due to the only limited free motion of the links relative to each other followed by a snap action or rapid acceleration applied to the hook 16 by the rod 31, which rod 31, although light in absolute terms, is relative to the assembly 14, a large mass, being many (13) times as heavy as assembly 14 and 16.

If live bait such as a minnow is used on hook 16, the minnow can, after being let into the brush, as 24, swim or move three inches from the end 37 of rod 31 in any of a large variety of directions with its natural motions, prior to being restricted by the limitations of the linkage connections of assembly 14 to rod 31 and it may then resume characteristic live motion in another direction. In this motion of the bait or minnow it is substantially impossible for such bait, to become entangled in the brush as 24, or to wrap around a limb, whereas if one were using a limp line for connection to the hook from the sinker the bait could readily become entangled in the brush or wrapped around a limb as shown on limb 25c of FIGURE 1.

As the rod 31 is sufficiently long to be far longer than the maximum length of any possible combination of rigid elements in assemblies 14 and 16, operator's up and down movement of rod 31 for the length of assembly 14 provides release of any attempted encirclement of any branch by the rigid loosely and pivotally connected units 40, 50 and 60 of assembly 14. Preferably rod unit 12 is four times as long as the length of elements 14 and 16, as a minimum.

The smooth and rounded outlines of the elements of apparatus 10 help avoid any catching thereof in underwater brush.

The rod 31 being dense, although not very heavy, provides for sinking of the apparatus 10 to the bottom of a lake or water body (assuming use of line 18 of usual density) and because of the density of the rod and the resulting vertical orientation of the axis thereof and the area of plates 36 and 32, a slight rotary motion about the vertical axis thereof occurs when horizontal water currents meet the rod 31, as above described.

The rod 31, being stiff and fairly long prevents a live bait as 29 or a hooked fish as 28B from winding unit 12 around an underwater branch as 25B. The unit 12 being resilient, returns to its original straight shape while avoiding being wound around a limb as 25B. Notwithstanding these mechanically desirable effects of its length, rod 31 is not so heavy that the operator 22 cannot sense a "nibble" of a fish on the hook 16 and also is sufficiently light and flexible and resilient that a fish biting on hook 16 cannot, by a rapid motion, tear itself loose from the hook because of the inertia of the rod 31 in the water; to the contrary the fish as 28C prior to (or while) nibbling at the baited hook 16 on the low inertia apparatus 10 prior to biting thereon is given confidence, because of the relative lack of limitation of motion of such bait, that the bait is free and will more readily seize the bait, than where the bait is held by a heavy sinker against such free motion.

TABLE I

| | |
|---|---|
| Assembly 14 _____grains__ | 14 |
| Length end to end of 12 (range of 15″ to 18″) ___ | 16″ |
| Weight of 12 (240 grains) ½ troy ounce) pennyweight__ | 10 |
| Material of 12 _____ | Steel |
| Diameter (31) _____ | 3/32″ |
| Plate 32, width _____ | ¼″ |
| Wire at 41, diameter (steel) _____mm__ | 0.5 |
| Link 40: | |
| Length 47–48 _____mm__ | 19 |
| Width 44–46 _____mm__ | 5 |
| Body 42, length (direction 47–48) _____mm__ | 5 |
| Plate 45, thickness (brass) _____mm__ | .025 |
| Element 50, overall length weight _____mm__ | 20 |
| Wire 59, diameter (brass) _____mm__ | .7 |
| Loop 51, diameter _____mm__ | .4 |
| Hook 16, eye 71: | |
| Diameter _____mm__ | 2 |
| Wire thickness _____mm__ | 1 |
| Length 71: | |
| End of 73 _____ | 1½″ |
| Weight _____grains__ | 4 |

Another embodiment of this invention is shown in FIGURE 8. Apparatus 90 of this invention comprises a stiff rod unit 12′, non-tangling link assembly 94 and a hook 16′ operatively connected. The structure and connection of the components of 12′ and 16′ are identical to those referred to by the reference number 12 and 16 of apparatus 10 and are formed of elements and sub-assemblies numbered with prime (′) super-script (as 31′) correspondingly respectively with the elements (as 31) similarly numbered of the apparatus 10 above described. The link assembly 94 comprises a series of S-shaped links 95, 96, 97 and 98 each of which is rigid, and each, as in apparatus 10 comprising two stiff loops, as 99 and 100 of the element 98, with an area as 101 and 102 enclosed in each loop 99 and 100 respectively. The portion as 103 in 98 of each S-shaped member intermediate the ends of the links separates the areas closed by each loop and prevents any one loop as 96 from contacting directly the end of the loop, as 98, also linked to and so held by the intermediate link as 97. This is effective to prevent tangling where only four such links are used. The drawing of FIGURE 8 is to scale. Links 96, 97 and 98 are identical in size and shape, the links are made of steel wire 0.7 mm. diameter, are 10 mm. in overall length and 3 mm. overall width. Assembly 14 is 1¼ inch maximum length and weighs 5 grains. There may be 10 percent variation in the size of these dimensions.

As in the case of apparatus 10, the area as 101 within the loop as 99 is far greater than the cross-sectional area of the metal wire forming the loop as 97 linked therewith. This provides for a large and substantial amount of free motion of any one link, as 97, with a link as 98 to which it is linked yet, as above described, the rotation of any one link with respect to another is limited. The extent and limitations of movement of assembly 94 relative to unit 12′ are qualitatively the same as above described for unit 14. However, as the weight of assembly 94 is less than the weight of assembly 14, movement thereof is somewhat more lively than above described for apparatus 10.

The difference is further increased because the length of assembly 94 is less than that of assembly 14.

Although in accordance with the provision of the patent statutes, particular preferred embodiments of this invention have been described and the principles of the invention have been described in the best mode in which it is now contemplated applying such principles, it will be understood that the operations, constructions and compositions shown and described are merely illustrative and that the invention is not limited thereto and, accordingly, alterations and modifications which readily suggest themselves to persons skilled in the art without departing from the true spirit of the invention.

I claim:

1. A fishing rig comprising, in operative combination,
   (a) a long thin stiff yet resilient substantially straight metal rod, a transverse hole through one end of said rod, means at the other end of said rod for attachment of a fishing line thereto, said rod being free of lateral extensions between said hole at said one end of said rod and said means at said other end of said rod,
   (b) a series of short relatively rigid links, each link comprising two stiff loops, one at each end of each link, an area enclosed within each loop, a member intermediate the ends of each link, said member located between and separating the areas enclosed by each loop, said links serially linked to each other, the cross-sectional area within each of said loops being greater than the cross-sectional area of the material of the loop linkedly connected thereto and located therein,
   (c) a hook comprising an eye, a point and a shaft, one end of said series of links attached to said hole at said one end of said long thin resilient rod and the other end of said series of links attached to said eye of said hook, said one end of said series of links and said means at said other end of said rod for attachment of a fishing line being joined only by said rod, and
   (d) the maximum length of said linked series of links and hook being less than one quarter the length of said rod, the weight of said series of links and hook being less than 20 percent of the weight of said rod.

2. Apparatus as in claim 1 wherein the length of said resilient rod is in the range of 15 to 18 inches, the weight thereof is 240 grains plus or minus 25 percent and the weight of said series of short rigid links is in the range of 5 to 15 grains and the links are of the same length plus or minus 10 percent.

3. Apparatus as in claim 2 wherein there are three links in said series of said links.

4. Apparatus as in claim 3, wherein said series of short relatively rigid links comprises, in series, a first releasable snap means, a rigid swivel means and a second snap means, each of said rigid snap means being flat and the loops at either end of said rigid swivel means being located at either end of a longitudinal axis of said rigid swivel means, said loops being rotatable about said longitudinal axis.

References Cited

UNITED STATES PATENTS

| | | | |
|---|---|---|---|
| 1,720,287 | 7/1929 | Moore _____ | 43—43.15 X |
| 1,728,560 | 9/1929 | Goshorn _____ | 43—44.83 X |
| 2,231,616 | 2/1941 | Costantino _____ | 43—43.15 X |
| 2,665,516 | 1/1954 | Race _____ | 43—44.83 X |
| 2,754,615 | 7/1956 | Toil _____ | 43—44.83 |
| 3,118,245 | 1/1964 | Shriver _____ | 43—43.15 |

SAMUEL KOREN, Primary Examiner

JAMES H. CZERWONKY, Assistant Examiner

U.S. Cl. X.R.

43—43.13, 44.83, 44.97, 44.98